Sept. 1, 1964 S. F. CHAPPELL 3,146,919
BALL FOLLOWER DISPENSER
Filed Oct. 17, 1960 2 Sheets-Sheet 1

INVENTOR.
Story F. Chappell
BY
Curtis, Morris, & Safford
ATTORNEYS

Sept. 1, 1964　　　　S. F. CHAPPELL　　　　3,146,919
BALL FOLLOWER DISPENSER
Filed Oct. 17, 1960　　　　　　　　　　　　2 Sheets-Sheet 2

INVENTOR.
Story F. Chappell
BY
Curtis, Morris, & Safford
ATTORNEYS

United States Patent Office 3,146,919
Patented Sept. 1, 1964

3,146,919
BALL FOLLOWER DISPENSER
Story F. Chappell, 9 Knoll St., Riverside, Conn.
Filed Oct. 17, 1960, Ser. No. 63,002
4 Claims. (Cl. 222—212)

This invention relates to dispensers and in particular to dispensers which are suitable for use with a squeeze-type container of thick or viscous liquid, such as a detergent, soap, and shampoo.

Detergents, soaps, and shampoos are now commonly packaged in "squeeze-bottle" type containers which may readily be used with dispensers which provide a consistent (within tolerances acceptable to the trade) measured dose. However, as far as it is known, no commercially-acceptable dispenser of this type is available which will meet the needs of these thick heavy liquids.

In order to use many detergents properly and economically, it is necessary that only a definite and measured amount of detergent be used in making each quantity of solution. Heretofore, the standard means of measuring the correct amount of liquid detergent has been to fill the closure cap of the container with detergent so that the cap serves as a measuring cup. Such a measuring operation is cumbersome and messy as well as being a nuisance to the user.

Dispensers designed for use primarily with thin and watery liquids have not proved to be satisfactory with heavy, viscous liquids. They are also generally intricate in design and fairly expensive to manufacture and are not usually designed for insertion into containers as part of an automatic factory loading operation.

Accordingly, it is an object of the present invention to provide a squeeze-bottle dispenser particularly adapted for use with thick, viscous liquids such as detergents, shampoos, soaps, etc. It is another object to provide a squeeze-bottle dispenser which is of simple construction and inexpensive to manufacture. It is a further object to provide a dispenser which is adapted for installation into a squeeze-type container, with flexible or semi-rigid sidewalls, during a factory container filling operation using automatic machinery.

It is still another object of the present invention to provide a squeeze-bottle dispenser wherein the container in which it is placed can be picked up from any position. It is not necessary to hold the container any certain way or on a designated pouring side in order to have the dispenser operate satisfactorily. It is also a further object to provide a dispenser which gives a quick measured dose, with the flow of liquid being cut off abruptly with no after-drip, as soon as the measured amount is delivered.

In the accompanying drawings, preferred embodiments of the present invention are shown and these embodiments are described in detail in the specification. However, it is to be understood that the drawings and description are not intended to be either exhaustive or limiting of the present invention in improved squeeze-bottle dispensers, but on the contrary, are for the purpose of illustrating and describing the invention in order that others skilled in the art may fully understand the invention, its principles and the application thereof and that they may embody it and adapt it in numerous forms, each as may be best suited to the requirements of a particular dispenser and its intended usage.

Figure 1:
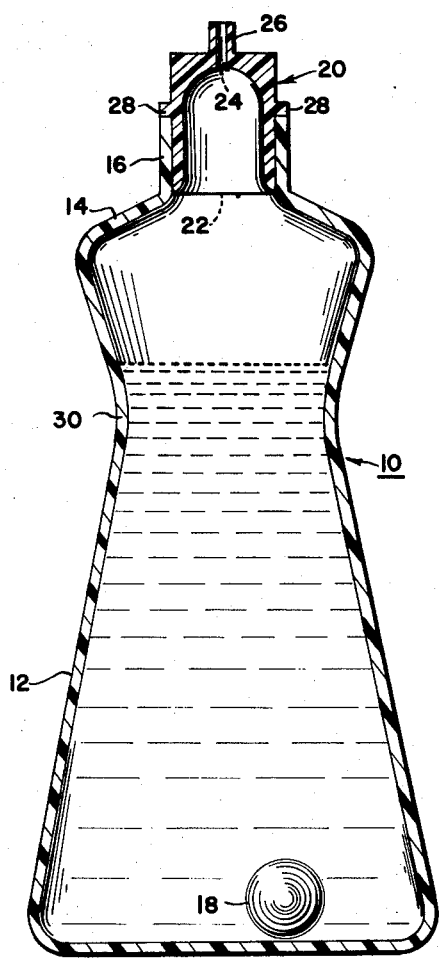
FIGURE 1 is a sectional view of a dispenser and container combination in accordance with the present invention.

Referring to the drawings and to FIGURE 1 in particular, a container 10 of the "squeeze-bottle" type is shown. This container is made of plastic, rubber, or other suitable material and it has flexible or semi-rigid sidewalls 12. The upper portion 14 of the sidewalls 12 of the container 10 is constructed in a funnel-like shape, tapering on all sides towards a neck 16. When the container 10 is inverted, a ball valve 18 (which in this embodiment is in free position inside of container 10) falls and rolls towards and through unobstructed neck portion 16, no matter in what pouring position container 10 is turned.

Figure 2:
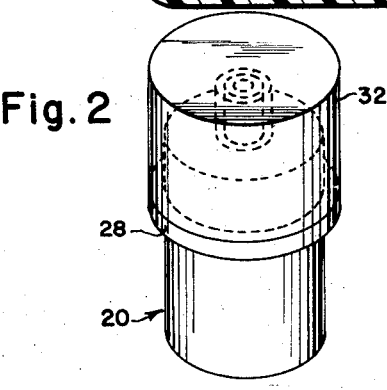
FIGURE 2 is a perspective view of the dispenser of FIGURE 1 and further including a cap closure.

A dispenser 20 is provided and inserted into the neck 16 of the container 10. The dispenser 20 in the illustrated embodiment is a cylinder with a relatively large lower opening 22 and a relatively small upper opening 24. In FIGURES 1 and 2 a tubular extension is provided above the small upper opening 24 to form a desirable pouring spout 26.

The lower opening 22 is advantageously as large as can be accommodated within neck 16, although it may be smaller, if desired.

The size of opening 24 and the spout 26 is determined by the viscosity of the liquid stored in the container 10. However, it is desirable that it be of such restricted size that no appreciable amount of liquid will pour out of it when the container is in an inverted position unless and until the container 10 is squeezed. Without this restricted size opening, liquid will flow out of the spout 26 immediately on inversion of the container 10 and even more liquid will flow out when the container is full than when it is relatively empty because when the container is full, it takes relatively less time for liquid to reach opening 24 due to its nearness to the opening. Thus, the restricted opening is advantageous, for without the restricted opening a consistent measured amount is not obtained.

The volume of the dispenser 20 determines the amount of each measured dose since the ball valve and squeeze action expel whatever quantity is in the dispenser 20 as discussed hereinafter.

The ball valve 18 is made of any suitable non-buoyant material and is preferably of a substantial weight that will carry it through the liquid quickly when the container 10 is inverted. The diameter of the ball valve 18 is approximately equal to, or slightly less than, the diameter of the lower dispenser opening 22, being of such size that the wall valve 18 will have a snug-fit relationship with the opening 22 and the cylinder formed by the sidewalls of the dispenser 20.

In assembling, the ball valve 18 is permitted to fall free within the container 10. The ball valve 18 may be inserted before or after container is loaded with liquid at the factory. After liquid and the ball valve are loaded in the container 10, the dispenser 20 is inserted into the neck 16, with a friction-fit, threaded connection, adhesives, or any suitable means to hold securely in place. Advantageously the lower edge of the dispenser 20 does not extend beyond the junction point of the neck 16 and the upper portion 14 of the sidewalls 12. Any substantial inward projection of the dispenser beyond this point impedes the fall of the ball valve 18 into opening 22 and also serves to trap some liquid in the container 10.

To insure against the dispenser 20 projecting into the container 10 as discussed above, a shoulder 28 on the dispenser 20 is provided to act as a stop and to prevent the insertion of the dispenser into the container beyond the desired extent.

When the user desires to pour a measured dose of liquid, the container 10 is inverted to an upside down position without squeezing. When this is done, the viscous liquid falls into the dispenser 20 but does not flow out of small upper opening 24 in any appreciable amount. Following closely behind the falling liquid is the free-falling ball valve 18 which finds its way to the larger lower opening 22 and is momentarily supported there by the column of liquid contained in the dispenser 20. At this stage of the pouring operation the ball valve 18 has trapped within the dispenser 20 the amount of liquid to be metered. Squeeze pressure is then applied to the container 10, collapsing the sidewalls 12, increasing the pressure inside the container, and forcing the ball valve 18 the length of the dispenser 20. The ball valve 18 in turn forces the liquid which is trapped within the dispenser 20 out through upper opening 24 and through the spout 26. Thus, the ball valve acts as a plunger within a cylinder. When the ball valve 18 becomes momentarily seated at the lower opening 22, the flow of liquid from container 10 to dispenser 20 is cut off and the liquid remaining in the container 10 cannot flow out.

When the flow of liquid from the dispenser is stopped by the seating of the ball valve at the upper opening 24, the user returns the container to an upright position and releases the applied squeeze-pressure thus permitting the sidewalls 12 to return to their original position. The outflow of liquid before the return of the sidewalls to position, creates a partial vacuum in the container 10. Thus, the greater outside air pressure, plus gravity, force the ball valve 18 away from the opening 24 in the dispenser and into container again, allowing air to enter container 10 through the upper opening 24. With pressure within the container again equal to outside air pressure the container is now ready for its next use.

In order to insure proper seating of the ball valve 18 at the opening 24, the upper and inner portion of the dispenser 20 is advantageously curved about the opening 24, to substantially the same curvature as the ball valve. Thus, a tight seal is obtained.

In using the dispenser illustrated in FIGURES 1 and 2, it is desirable to pause a brief moment after the container is inverted and before squeezing. This allows sufficient time for the ball valve 18 to drop through the liquid to the opening 22 before pressure is applied; particularly when the container 10 is in a relatively full condition and the ball valve 18 must drop through a relatively greater amount of liquid.

It is also advantageous to have an inwardly protruding section 30 in the sidewall 12. This and the resulting outwardly protruding section in the area of upper sidewall portion 14 delay the roll of the ball valve 18 down to opening 22, thus giving the liquid sufficient time to get to the dispenser 20 ahead of the ball valve 18 when container 10 is in a near-empty state.

With heavy, viscous liquids such as detergents, caking or drying of the liquid about the opening due to evaporation is a problem. Accordingly, a removable cap 32 is provided to prevent this. The cap may be large enough to cover the entire dispenser top, as shown in FIGURE 2 or, optionally, smaller in size to cover only spout 26 of dispenser 20.

Figure 3:
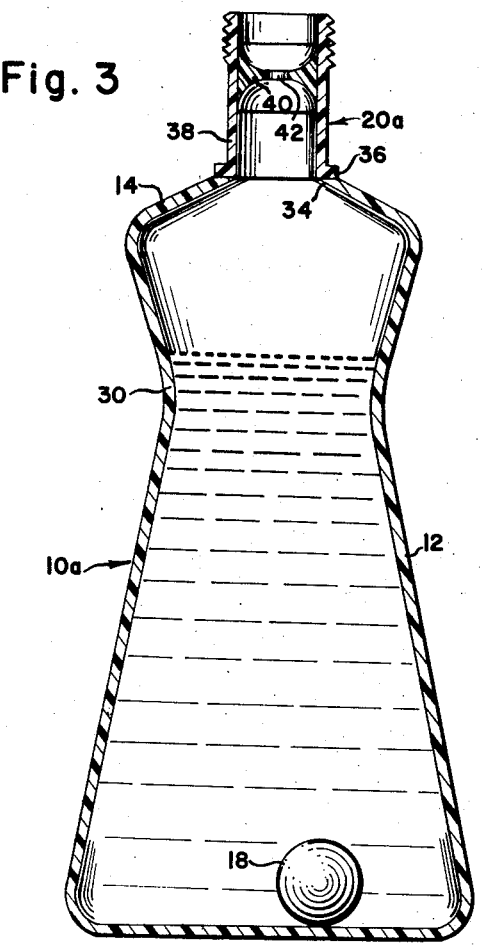
FIGURE 3 is a sectional view of another embodiment of a dispenser and container.

In FIGURE 3, another embodiment of the present invention is shown. In this embodiment, a container 10a is provided which does not have a conventional neck portion 16 at the top of the container, as shown in FIGURE 1. In place of the neck, a dispenser 20a is permanently sealed or otherwise affixed to the container 10a by means of mating shoulders 34 and 36 which are integral parts of the container 10a and the dispenser 20a respectively.

The container 10a is loaded with liquid and the ball valve 18 inserted prior to the attachment of the dispenser 20a.

The dispenser 20a is provided with a sidewall 38 which extends upwardly above a convex-concave partition 40. The partition 40 has an opening 42 therein which corresponds to the upper opening 24 of dispenser 20. The convex-concave partition construction insures that the ball valve will be properly seated for closing off flow of liquid through opening 42 when the container 10a is inverted to a pouring position and squeezed.

The upwardly extending portion of sidewall 38 serves as a pouring spout as well as a drip catcher for liquid and combines with the partition 40 construction to insure that a minimum of caking takes place in the dispenser. Any liquid adhering to the inner surface of the upper portion of sidewall 38 as a film or droplets will drain towards the partition 40 and due to the partition's concave upper surface, through the partition opening 42.

In a modification of the embodiment shown in FIGURE 3, dispenser sidewalls 38 may be formed by an upward continuation of the upper portion 14 of the sidewalls 12, thus eliminating shoulders 34 and 36, and forming a conventional neck 16 or, pouring spout that becomes an integral part of container 10a as in container 10 shown in FIGURE 1. In this modification, the convex-concave partition 40 is a separate unit which is positioned within dispenser 20a as shown in FIGURE 3, after liquid and ball valve 18 have been loaded into the container.

Figure 4:
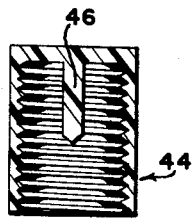
FIGURE 4 is a sectional view of a cap for use with the dispenser of FIGURE 3.

When the immediate use of the dispenser 20a and the container 10a combination is finished, the dispenser may be sealed by a screw type cap 44 of the type shown in FIGURE 4. This cap has an optional internal prong 46 which mates with the opening 42 in the partition 40 when the cap is screwed on to the dispenser 20a. The prong 46 is preferably made from a plastic or other material which is resistant to torsional stress.

When the prong is inserted into the opening 42 substantially all of the liquid therein is cleared away, and the closure cap effectively seals the spout opening to prevent evaporation that might cause the liquid to cake and freeze the prong 46 in the opening 42. In removing the cap 44 the prong 46 is freed and opening 42 is cleared and ready for use.

In actual operation, the embodiment of FIGURE 3 functions the same as discussed heretofore in reference to the embodiment of FIGURE 1.

Figure 5:
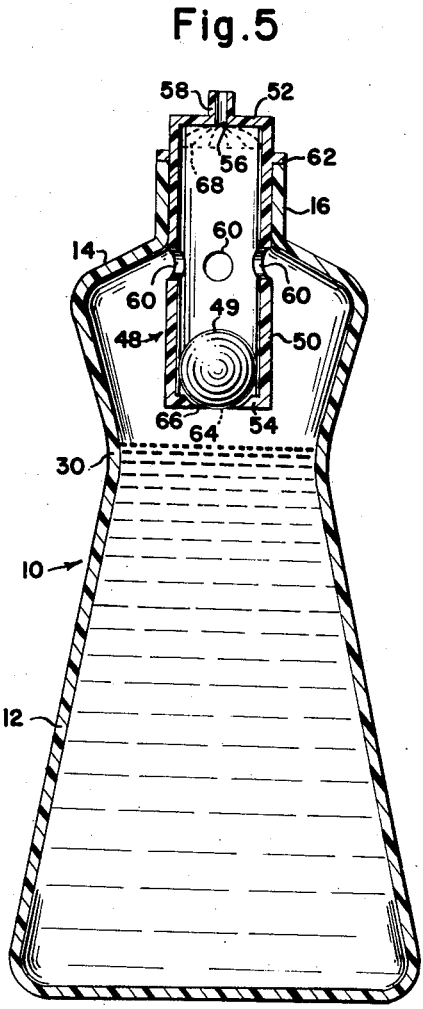
FIGURE 5 is a sectional view of another dispenser and container combination.

In FIGURE 5 another embodiment of the present invention in dispensers is shown. In this embodiment a dispenser 48 is provided which has the ball valve 49 contained therein.

The dispenser 48 is inserted into a container 10 after the container has been filled with liquid such as a viscous detergent.

The dispenser 48 comprises generally a cylinder with a sidewall 50, a top wall 52, and a bottom wall 54. The top wall 52 is provided with a pouring opening 56. A spout 58 may be fitted over this opening 56 to facilitate pouring of the liquid.

The sidewall 50 has a series of openings 60 which are intermediately positioned between the top wall 52 and the bottom wall 54. The dispenser 48 is inserted into the container 10 and so positioned that the openings 60 are located at the junction between the neck 16 and the upper portion 14 of the container sidewalls 12. To insure that the dispenser stays in place, the dispenser may be held in position by adhesives, heat sealing, or any other suitable means. In the illustrated embodiment of FIGURE 5, a shoulder 62 is provided on the dispenser 48 and this shoulder limits the depth of insertion of the dispenser 48 so that proper alignment of the sidewall openings 60 is obtained.

The ball valve 49 assumes an at rest position at the bottom end of the dispenser 48 and seats in an opening 64 in the bottom wall 54. The opening 64 is advantageously formed with a curvature mating with the curvature of the ball valve 49 so that proper seating is obtained.

In operation the embodiment of FIGURE 5 is first inverted without squeezing the flexible wall container 10. As the liquid flows through the sidewall openings 60 and into the interior of the dispenser 48, the ball valve 49 remains temporarily seated against the opening 64 by suction action plus the stickiness characteristic of these liquids, while liquid fills the dispenser 48. After a moment the bottle is squeezed. The squeeze pressure causes the ball valve 49 to become unseated and it is forced downwardly towards the top wall opening 56. The ball valve 49 extends substantially across the dispenser 48 and as it falls towards the top wall opening 56 it acts as a piston forcing the liquid ahead of it. The forced liquid is pushed out the opening 56 and through the spout 58, if one is provided.

The amount of liquid dispensed by the embodiment of FIGURE 5 will be the liquid forced from the dispenser by the ball valve during its fall plus the additional liquid forced through the dispenser until the ball valve 49 passes the sidewall openings 60. Accordingly, the volume of the interior of the dispenser and the number and size of the sidewall openings 60 determine the amount of detergent which is dispensed in each operation.

In a modification of the dispenser 48, the ball valve 49 may be made wholly or partially of ferrous metal. With such a ball valve a magnetic strip of material 66 is applied to the bottom wall opening 64. In this embodiment the ball valve 49 is held in place by the light magnetic force of the strip 66 until dislodged by the squeeze pressure created during the dispensing operation. Optionally, the ball valve may be magnetized instead of the strip of material 66.

The ferrous metal ball valve may be of stainless steel or a ferrous metal shell or coating may be applied to a glass or suitable dense ball.

If desired the inner surface of the top wall 52 may be curved to provide a mating surface 68 (shown in the phantom lines in FIGURE 5) for the ball valve 49 and thus insure close off of the top wall opening 56.

A cap 32 may also be provided for dispenser 48 as shown on dispenser 20 in FIGURE 2.

It is to be understood that a pronged cap such as cap 44 may also be used for closing off dispensers 20 and 48 if desired.

Figure 1A:
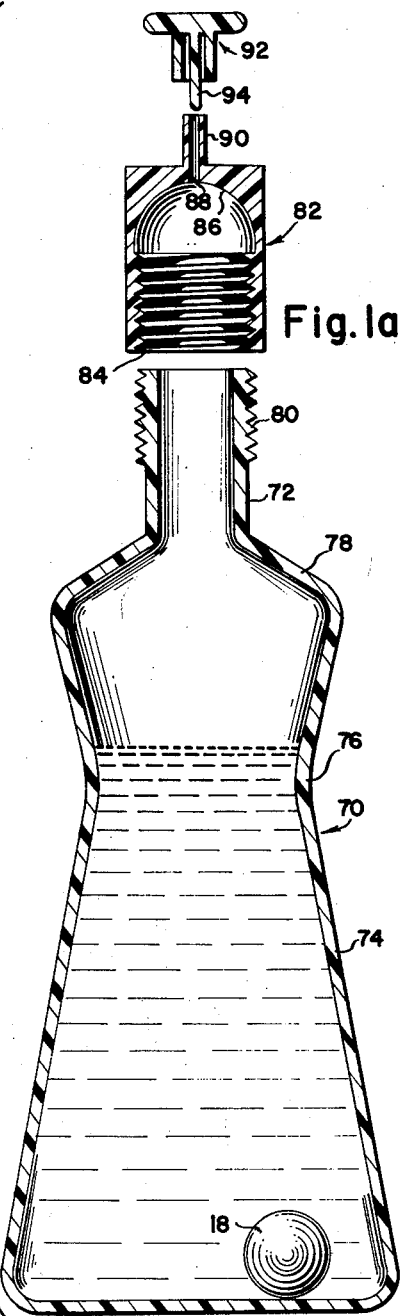
FIGURE 1a is a sectional view of another dispenser and container combination.

In FIGURE 1a still another embodiment of the present invention is shown wherein the dispenser and container combination includes a container neck or spout, a snug-fit ball valve and a cap screwed or otherwise affixed onto the neck of the container. As shown in FIGURE 1a, a container 70 is provided with a slightly elongated neck 72 which acts as the sidewall portion of the dispenser chamber. The shape of the body portion of the container 70 is similar to container 10, and has sidewalls 74, a reduced intermediate portion 76 and an inclined upper portion 78. The neck 72 is provided with exterior threads 80 onto which is screwed a dispenser top 82.

The dispenser top 82 has interior threads 84 so that it may be affixed to the neck 72. The inner top surface 86 of the top 82, shown convex here, may be of any desirable shape or construction that will substantially mate with a ball valve 18, including a sharpe edge portion such as the bottom of a skirt wall.

The ball valve 18 is placed in the container 70 before the top 82 is screwed or otherwise affixed onto the neck 72. A restricted top opening 88 is also provided in the top 82 and, in the illustrated embodiment of FIGURE 1a, a spout 90 is provided above this opening.

To seal the spout 90 and the opening 88 a cap 92 is provided. This cap 92 may be provided with a central prong 94 to keep the spout 90 and the opening 88 clear.

The operation and function of the embodiment of FIGURE 1a is similar to that shown in FIGURE 1.

In the foregoing description it is to be understood that the terms "convex" and "concave" are used to define the structure as viewed from top to bottom when the container and dispenser combination is in an upright position.

From the foregoing it is evident that the present invention provides new and useful embodiments in the art of dispensers.

I claim:

1. A dispenser in combination with a container having flexible sidewalls, a top opening and a bottom wall, the interior of said container being substantially free of any obstructions, said dispenser comprising a top opening, cylindrical sidewalls and a bottom opening and a ball valve within the container, said dispenser being positioned at the upper portion of the container near the container's top opening, the top dispenser opening being of reduced size and smaller than the diameter of the ball valve and the diameter of the bottom dispenser opening and dispenser sidewalls being approximately the same or slightly greater than the diameter of the ball valve, said bottom opening being shut off from communication with the lower portion of the container by said ball valve when said container and dispenser are inverted, the bottom dispenser opening and the top container opening being in communication whereby the ball valve on inversion of said container is movable to a position adjacent to and opposite the top opening in the dispenser and flow of liquid from the container through said opening is shut off and said valve is further movable to seat against the top dispenser opening by squeeze pressure exerted on the flexible container walls.

2. A dispenser and container combination for viscous liquids, the container having flexible sidewalls, a top opening and a bottom wall said sidewalls converging inwardly at a point below said top opening and diverging outwardly to a second point also below said top opening but above said first point and the sidewalls above said second point converging towards said top opening, the dispenser being affixed to the upper portion of the container, the dispenser having a top opening, cylindrical side walls and a bottom opening, a ball valve of substantially the same diameter as the dispenser bottom opening and the diameter of the dispenser confined within the container, said dispenser having a restricted top opening of smaller diameter than the ball valve and a convex inner top surface surrounding said top opening, said ball valve having a curvature substantially mating with the inner top surface of the dispenser, said ball valve being movable within said container to a mating position with the convex inner surface upon inversion of the container whereby said ball valve moves over a circuitous route defined by the converging and diverging sidewalls of the container and liquid will flow in a measured amount through the dispenser before the ball valve becomes seated and shuts off the flow.

3. A dispenser and container combination as defined in claim 2 wherein said container has an open neck portion above the top opening and the dispenser is fitted within said neck and extends to said top opening, the extent of the dispenser into said neck being limited by a shoulder on the outer surface of the dispenser which abuts against the upper portion of the neck.

4. A dispenser and container combination for viscous liquids, the container having flexible sidewalls, a bottom wall and a top cylindrical neck portion with an open area therethrough which acts as the body portion of the dispenser and is joined to said sidewalls, a dispenser top fitted to said neck portion and positioned at the top of the container, said dispenser top having a top wall and sidewalls for joining the dispenser top to the dispenser body or container neck, said dispenser top wall having a small opening therein and a portion of the underside of said wall substantially mating with a ball valve located within the container, said ball valve being movable to a position near the top of the container upon inversion of the container, said ball valve having a diameter substantially the same or slightly less than the diameter of the open area through the neck portion and substantially greater than the diameter of the opening in the top wall, the curvature of the ball valve being adaptable to fit against a portion of the inner surface of the top wall whereby upon inversion of the container said ball valve being movable to a position at the neck of the container and upon the application of squeeze pressure to the container sidewalls said ball valve is further moved to a position mating with the inner surface of the dispenser top whereby before squeeze pressure is applied a measured dose of liquid is trapped in the dispenser body neck portion of the container and then on the application of squeeze pressure is forced out of the top dispenser opening and said opening thereafter sealed by the ball valve.

References Cited in the file of this patent

UNITED STATES PATENTS

| | | |
|---|---|---|
| 252,519 | Righter et al. | Jan. 17, 1882 |
| 2,943,767 | Moro-Lin | July 5, 1960 |

FOREIGN PATENTS

| | | |
|---|---|---|
| 674,355 | Great Britain | June 25, 1952 |
| 1,000,103 | France | Oct. 10, 1951 |